(12) United States Patent
Gage et al.

(10) Patent No.: US 6,806,998 B2
(45) Date of Patent: Oct. 19, 2004

(54) RAMAN AMPLIFIER WITH HIGH POWER DISTRIBUTION BYPASS

(75) Inventors: Edward C. Gage, Apple Valley, MN (US); Mark McElhinney, Lino Lakes, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 247 days.

(21) Appl. No.: 10/103,161

(22) Filed: Mar. 20, 2002

(65) Prior Publication Data

US 2003/0179987 A1 Sep. 25, 2003

(51) Int. Cl.[7] .................................................. H01S 3/00
(52) U.S. Cl. ....................................... 359/333; 359/334
(58) Field of Search ................................ 359/333, 334, 359/341.1

(56) References Cited

U.S. PATENT DOCUMENTS

| | | | | |
|---|---|---|---|---|
| 5,703,990 A | * | 12/1997 | Robertson et al. | 385/135 |
| 5,778,132 A | * | 7/1998 | Csipkes et al. | 385/135 |
| 5,917,648 A | * | 6/1999 | Harker | 359/341 |
| 6,674,567 B2 | * | 1/2004 | Ohtani et al. | 359/334 |

* cited by examiner

Primary Examiner—Mark Hellner

(57) ABSTRACT

An optical communications control station includes an equipment rack and a fiber frame for interfacing between the fiber communications link and the equipment in the rack. Raman pump lasers in the equipment rack produce a Raman pump output that bypasses the fiber frame and is coupled directly into the fiber communications link. The number of connectorized components that the pump light passes through is reduced, thus reducing the possibility of damaging fiber connections by passing the high power Raman pump light through fiber connections. The approach also reduces the possibility of an operator being inadvertently exposed to the high power Raman pump light, thus increasing operator safety.

28 Claims, 4 Drawing Sheets

RAMAN AMPLIFIER WITH HIGH POWER DISTRIBUTION BYPASS

FIELD OF THE INVENTION

The present invention is directed generally to fiber optical communications and more particularly to a configuration for pumping a Raman fiber amplifier.

BACKGROUND

Fiber Raman amplifiers are useful devices for providing gain to optical communications signals that propagate along optical fibers. One of the advantages of Raman amplifiers is that the gain is distributed over a long length of fiber, typically several kilometers, thus increasing the signal to noise ratio. The fiber Raman amplifier is pumped with high levels of pump light, typically around several hundred milliwatts and above. This contrasts with the optical communications signals, that are typically at the level of around a few millliwatts. The higher levels of Raman pump light result in greater demands on the power handling capabilities of the components through which the pump light passes.

SUMMARY OF THE INVENTION

Generally, the present invention relates to an approach for incorporating a Raman amplifier pump unit in a fiber equipment rack. The approach reduces the number of connectorized components that the pump light passes through, thus reducing the possibility of damaging fiber connections by passing the high power Raman pump light through fiber connections. The approach also reduces the possibility of an operator being inadvertently exposed to the high power Raman pump light, thus increasing operator safety.

One particular embodiment of the invention is directed to an optical communications station. The station includes a fiber communications link carrying a fiber communications signal falling in a signal wavelength range and a fiber equipment rack having fiber equipment units for communicating with the fiber communications link. The fiber equipment units include a Raman pump unit generating Raman pump light in a pump light wavelength range. A fiber interface frame contains fiber interface devices for interfacing between the fiber communications link and the fiber equipment rack. A coupling unit is disposed between the fiber communications link and the fiber interface devices to permit passage of light in the signal wavelength range between the fiber communications link and the fiber interface devices and to couple the Raman pump light from the Raman pump unit into the fiber communications link. The fiber communications link provides Raman gain to the fiber communications signal.

Another embodiment of the invention is directed to a method of operating a fiber communications station. Optical communications signals are propagated between a fiber communications link and a fiber communications equipment rack via a set of fiber interfaces. Signals are generated in the fiber communications equipment rack for controlling a Raman pump unit. Raman pump light is injected from the Raman pump unit into the fiber communications link while bypassing the set of fiber interfaces.

Another embodiment of the invention is directed to an optical station having means for propagating optical communications signals between a fiber communications link and a fiber communications equipment rack via a set of fiber interfaces, means for generating signals in the fiber communications equipment rack for controlling a Raman pump unit, and means for injecting Raman pump light from the Raman pump unit into the fiber communications link while bypassing the set of fiber interfaces.

Another embodiment of the invention is directed to an optical communications system that includes an optical transmitter producing optical communications signals in a signal wavelength range, a fiber communications link coupled to receive the optical communications signals, and an optical receiver receiving at least a portion of the optical communications signals from the fiber communications link. At least one of the optical transmitter and the optical receiver includes a fiber equipment rack having fiber equipment units for communicating with the fiber communications link. The fiber equipment units include a Raman pump unit generating Raman pump light in a pump light wavelength range. A fiber interface frame contains fiber interface devices for interfacing between the fiber communications link and the fiber equipment rack. A coupling unit is disposed between the fiber communications link and the fiber interface devices. The coupling unit permits passage of light in the signal wavelength range between the fiber communications link and the fiber interface devices. The coupling unit couples the Raman pump light from the Raman pump unit into the fiber communications link, whereby the fiber communications link provides Raman gain to the fiber communications signal.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
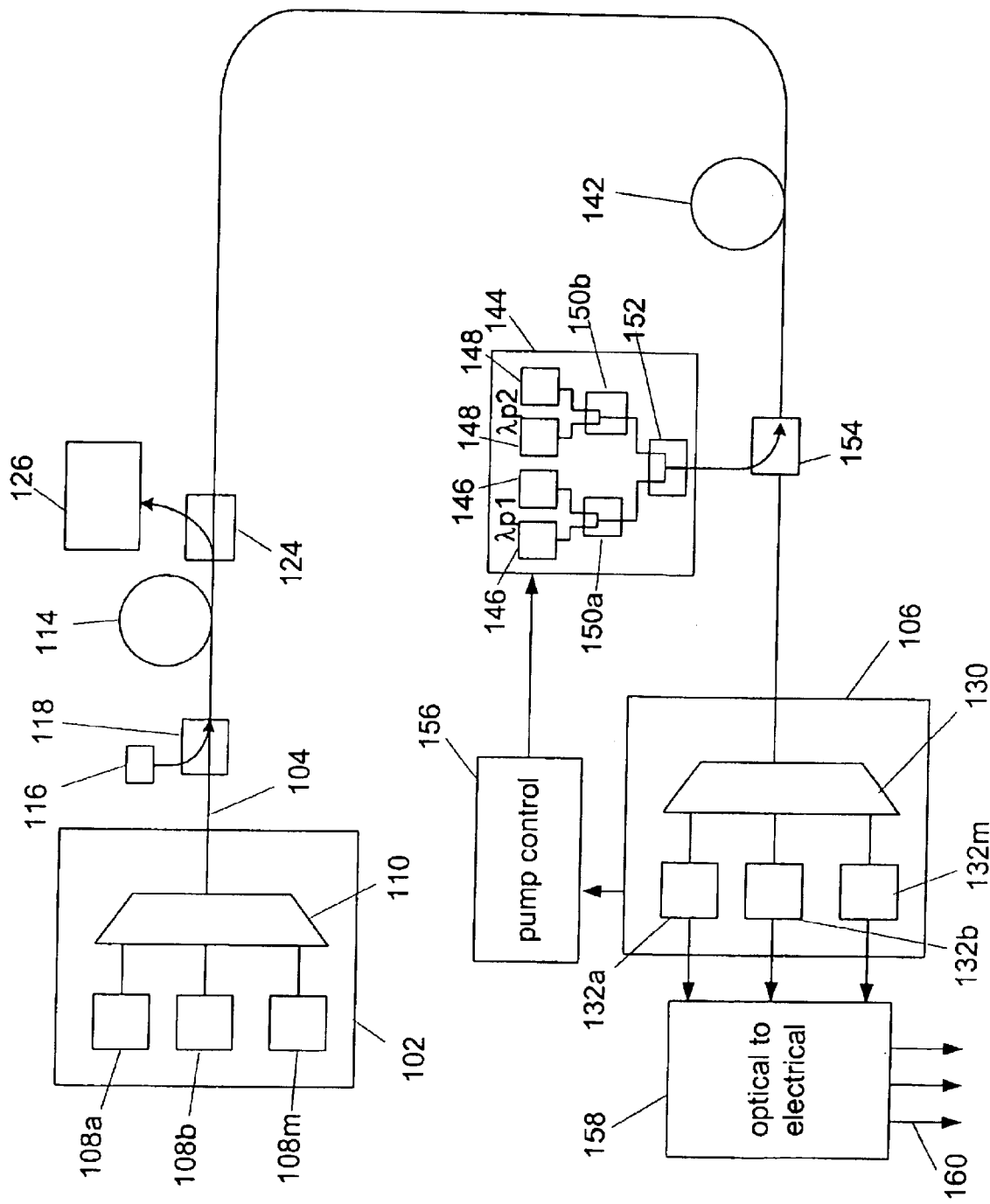
FIG. 1 schematically illustrates an optical communications system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, the present invention is directed to an approach for incorporating a Raman amplifier pump unit in a fiber equipment rack. The approach reduces the number of connectorized components that the pump light passes through, thus reducing the possibility of damaging fiber connections by passing the high power Raman pump light through fiber connections. The approach also reduces the possibility of an operator being inadvertently exposed to the high power Raman pump light, thus increasing operator safety.

A schematic of an embodiment of an optical communications system 100 is presented in FIG. 1. A DWDM transmitter 102 directs a DWDM signal having m channels through a fiber communications link 104 to a DWDM receiver 106.

In this particular embodiment of DWDM transmitter 102, a number of light sources 108a, 108b–108m generate light at different wavelengths, $\lambda a, \lambda b \ldots \lambda m$, corresponding to the different optical channels. The light output from the light sources 108a–108m is combined in a DWDM combiner unit 110, or multiplexer (MUX) unit to produce a DWDM output 112 propagating along the fiber link 104.

Light sources 108a–108m are typically laser sources whose output is externally modulated, although they may also be internally modulated laser sources, or the like. It will be appreciated that the DWDM transmitter 102 may be configured in many different ways to produce the DWDM output signal. For example, the MUX unit 110 may include an interleaver to interleave the outputs from different multiplexers. Furthermore, the DWDM transmitter 102 may be equipped with any suitable number of light sources for generating the required number of optical channels. For example, there may be twenty, forty or eighty optical channels, or more. The DWDM transmitter 102 may also be redundantly equipped with additional light sources to replace failed light sources.

Upon reaching the DWDM receiver 106, the DWDM signal is passed through a demultiplexer unit (DMUX) 130 to separate the multiplexed signal into individual channels that are directed to respective detectors 132a–132m.

The fiber link 104 may include one or more fiber amplifier units 114, for example rare earth-doped fiber amplifiers, Raman fiber amplifiers or a combination of rare earth-doped and Raman fiber amplifiers. The pump light may be introduced to the fiber amplifier 114 from a pump unit 116 via a coupler 118. Optical isolators (not shown) may be positioned along the fiber link 104 to prevent light from passing in the backwards direction. For example isolators may be positioned on either side of the amplifier 114 to reduce the possibility of backscattered light, propagating towards the transmitter 102, from being amplified in the amplifier 114.

The fiber link 104 may include one or more DWDM channel monitors 126 for monitoring the power in each of the channels propagating along the link 104. Typically, a fraction of the light propagating along the fiber link 104 is coupled out by a tap coupler 124 and directed to the DWDM channel monitor 126. The fiber link 104 may also include one or more gain flattening filters (not illustrated), typically positioned after an amplifier unit 114, to make the power spectrum of different channels flat. The channel monitor 126 may optionally direct channel power profile information to the gain flattening filter. The gain flattening filter may, in response to the information received from the channel monitor 126, alter the amount of attenuation of different channels in order to maintain a flat channel power profile, or a channel power profile having a desired profile.

A fiber Raman amplifier 142 (FRA) may be placed towards the end of the fiber link 104 so as to amplify the optical signals prior to entering the DWDM receiver 106. The FRA 142 may be pumped by a Raman pump unit 144 that includes one or more pump sources, typically having a wavelength in the range 1410–1500 nm for first Stokes Raman amplification of a communications signal at about 1510 nm–1600 nm. The Raman pump unit 144 may include pump sources that operate at different wavelengths so as to be able to produce a broad, adjustable Raman gain profile. In the particular embodiment illustrated, the pump unit 144 includes pump sources 146 and 148 operating at two different wavelengths, $\lambda p1$ and $\lambda p2$, although pump sources at other wavelengths may also be present. The outputs from the pump sources 146 and 148 may be polarization combined in respective polarization combiners 150a and 150b. The polarization-combined outputs may then be combined, for example in a wavelength division multiplexer 152, and the wavelength combined outputs coupled into the fiber link 104 via coupler 154.

The Raman pump unit 144 may be controlled by a pump unit controller 156 that receives power level signals from the receiver 106 that indicate the relative power levels in the different optical channels received by the receiver. The power level signals may be, for example produced by a channel monitor in the receiver 106. The pump unit controller 156 may then control the relative power levels of the different pump wavelengths so that the overall pump signal produces a desired Raman gain profile in the FRA 142 that results in a desired relationship in the power levels of the different optical channels. For example, it may be desirable for the power levels of all the optical channels to be the same, in which case the pump unit controller 156 may control the Raman gain spectrum in the FRA 142 to be flat over the bandwidth of the optical communications signal. In another example, some of the optical channels entering the FRA 142 may have experienced greater loss or gain than other channels in propagating along the fiber link 104. In this case, the Raman gain spectrum may be set to redress the resultant non-uniformity in the power levels of the different optical channels.

An optical to electrical interface 158 (OEI) may receive the detection signals from the detectors 132a–132m and convert the detection signals into electrical communications signals that are output to electrical communications equipment through electrical outputs 160. The OEI 158 may, for example, generate electrical output signals that conform to a particular communications protocol.

The fiber link 104 may include other components that are not shown, for example add/drop multiplexers, switches, filters, and the like.

Figure 2:
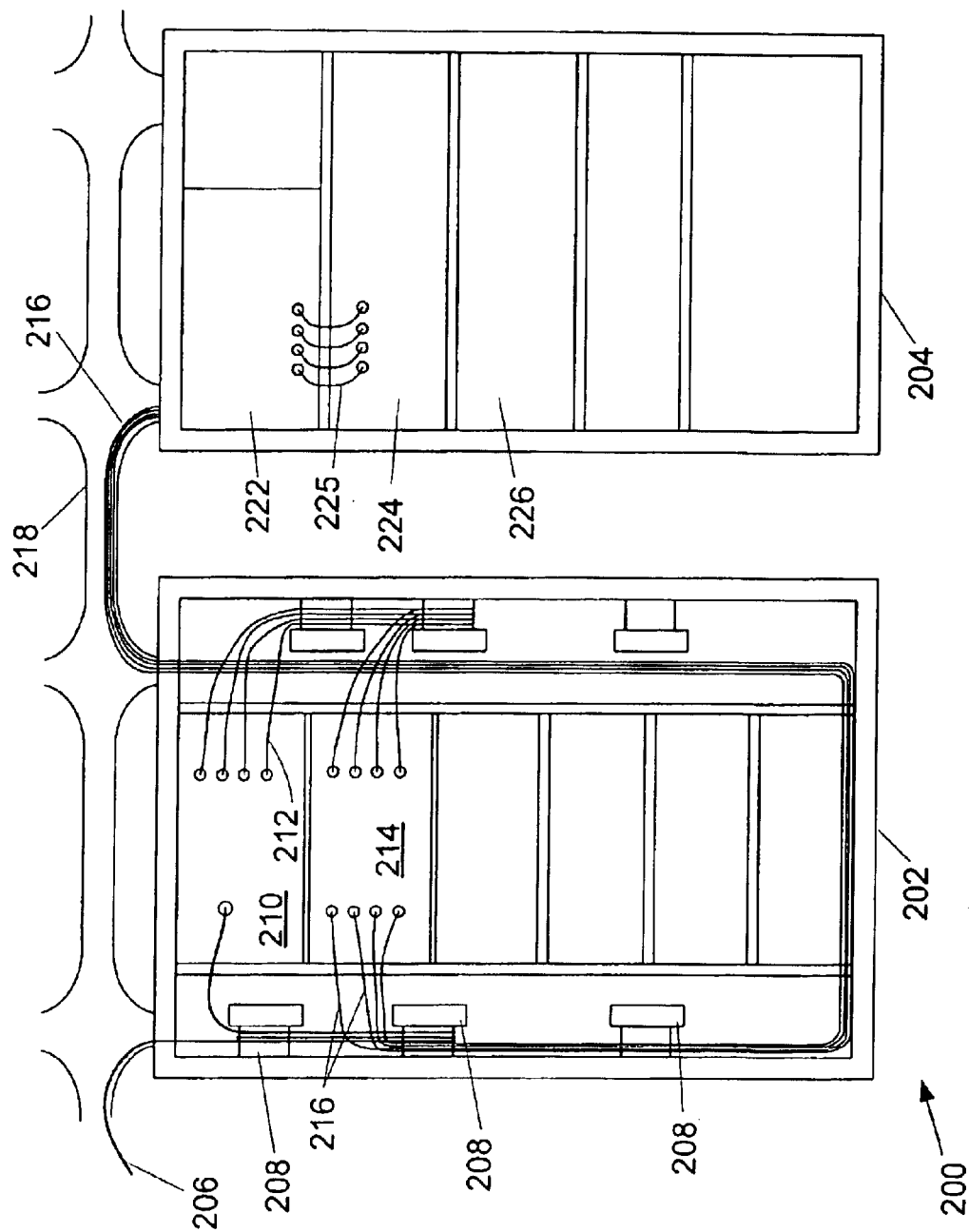
FIG. 2 schematically illustrates an equipment rack and fiber frame.

One particular embodiment of a fiber distribution frame and equipment rack that may be used for the optical transmitter or the optical receiver is schematically illustrated in FIG. 2. The fiber unit 200 includes a fiber frame 202 and an equipment rack 204. The fiber frame 202 includes various fiber splices, patchcords, connectors, taps, switches and the like, in an interface between the equipment rack 204 and the fiber cable link 206 that connects the rack 204 to the rest of the fiber communications system. The equipment in the equipment rack 204 may include, for example, light sources and modulators for generating optical signals in different optical channels, and DWDM units for combining the light from the different light sources. The equipment in the rack 204 may also include local amplifier units, typically erbium-doped fiber amplifier units, for amplifying the optical signal entering or leaving the rack, detectors for detecting the light entering the rack, and/or an optical-electrical interface. The optical/electrical interface may include circuitry for preparing a modulator signal for driving an optical modulator so as to impose information on an optical signal. The interface may also include circuitry for converting optical detection signals into electrical signals conforming to a particular protocol. The electrical signals may be of any particular form and, for example, may be in different protocols. The optical signals may be in any particular form, and may be in a protocol that is the same or different from that of the electrical signals.

In this particular embodiment, the fiber cable 206, connected to the fiber communications system, enters the frame 202, and is connected to one of the frame panels 210. The fiber 206 may be wrapped around a number of capstans 208 to control its effective length. The frame panel 210 may be a splice tray, a splice module, a fiber storage tray, a fiber storage disk or the like. In the illustrated embodiment, the frame panel 210 includes a splice module that receives the fiber cable 206 and splits the cable into a number of output fibers 212. The illustration shows four such fibers 212, although the number may be different. The fibers 212 may then be led to a different fiber panel 214 for splicing to different fibers 216. The fibers 212 may also be wound around capstans 208 for effectively controlling their lengths. The frame 202 is generally used for fiber management functions and may also be used to provide connector access for tests and upgrades.

The fibers 216 may then be led from the frame 202 to the rack 204. One way of doing this is to lead the fibers 216 via the overhead trays 218 to the rack 204. The fibers 216 may be inserted in either the front of the back of the equipment in the rack 204. In the illustrated embodiment, the fibers 216 are fed to the back of the equipment. Assuming first that the rack 204 includes equipment for a receiver unit, the rack 204 may include a demultiplexing unit 222 that demultiplexes and may also detect signals in the different optical channels. The rack 204 may also include a fiber amplifier unit 224 to boost the strength of the optical signals prior to detection. In such a case, the fibers 216 may be fed to the back of the amplifier unit 224 first, and then the outputs from the fiber amplifier unit 224 fed via fibers to demultiplexer unit 222 via patch fibers 225. The fiber amplifier unit 224 typically contains different amplifiers for the optical signals in the different fibers 216, and the fiber amplifiers are typically rare earth-doped fiber amplifiers. The fibers may be connected in the frame 202 and the rack 204 using any suitable type of connector, including FC, LC, and MTP types of connector.

The rack 204 may also include an optical-to-electrical interface 226, for converting the electrical signals received from the detectors in the demultiplexing unit 222 into signals of a recognized protocol for electrical signals. The interface 226 may be used for field replacement and upgrade.

It will be appreciated that different types of connectors may be used with the rack 204 and the frame, for example FC, LC, and MTP and other types of connectors may be used.

Under some circumstances, it may be advantageous to provide additional amplification to the optical signals close to the fiber unit. For example, it may be advantageous to provide Raman amplification to the optical signals propagating along the fiber cable 206. There may be problems, however, with inserting a Raman pump unit in the rack 204 and feeding the Raman pump light through the rack 204 and the frame 202 so that the Raman pump light is fed into the fiber cable 206. For example, the Raman pump light is generally at a high level, several hundreds of milliwatts to levels in excess of one Watt or more. Such a high power level may be too high to be withstood by some of the components in the fiber frame 202, for example fiber connectors and/or splices. Furthermore, this high power level may also cause problems with connectors and equipment in the equipment rack 204. In addition, the frame 202 and rack 204 are often worked for maintenance, with fibers being unconnected and reconnected. Thus, it is possible that a fiber carrying the Raman pump light may be disconnected inadvertently. While fiber connectors may be provided with automatic shutters to protect the operators from accidental exposure to laser light, these shutters may break or their performance may be compromised in some way. For example, where the shutter is a plastic dust cover that automatically covers the end of the fiber when the fiber is disconnected, the cover may melt upon exposure to the high power levels of the Raman pump beam.

It is important, therefore, to reduce the possibility that the Raman pump power causes damage or poses a risk to the operator. One approach to achieving this is for the Raman pump light to bypass the rack 204 and the frame 202, and to inject the Raman pump light into the fiber cable 206 at a point on the far side of the frame 202 from the rack 204.

Figure 3:
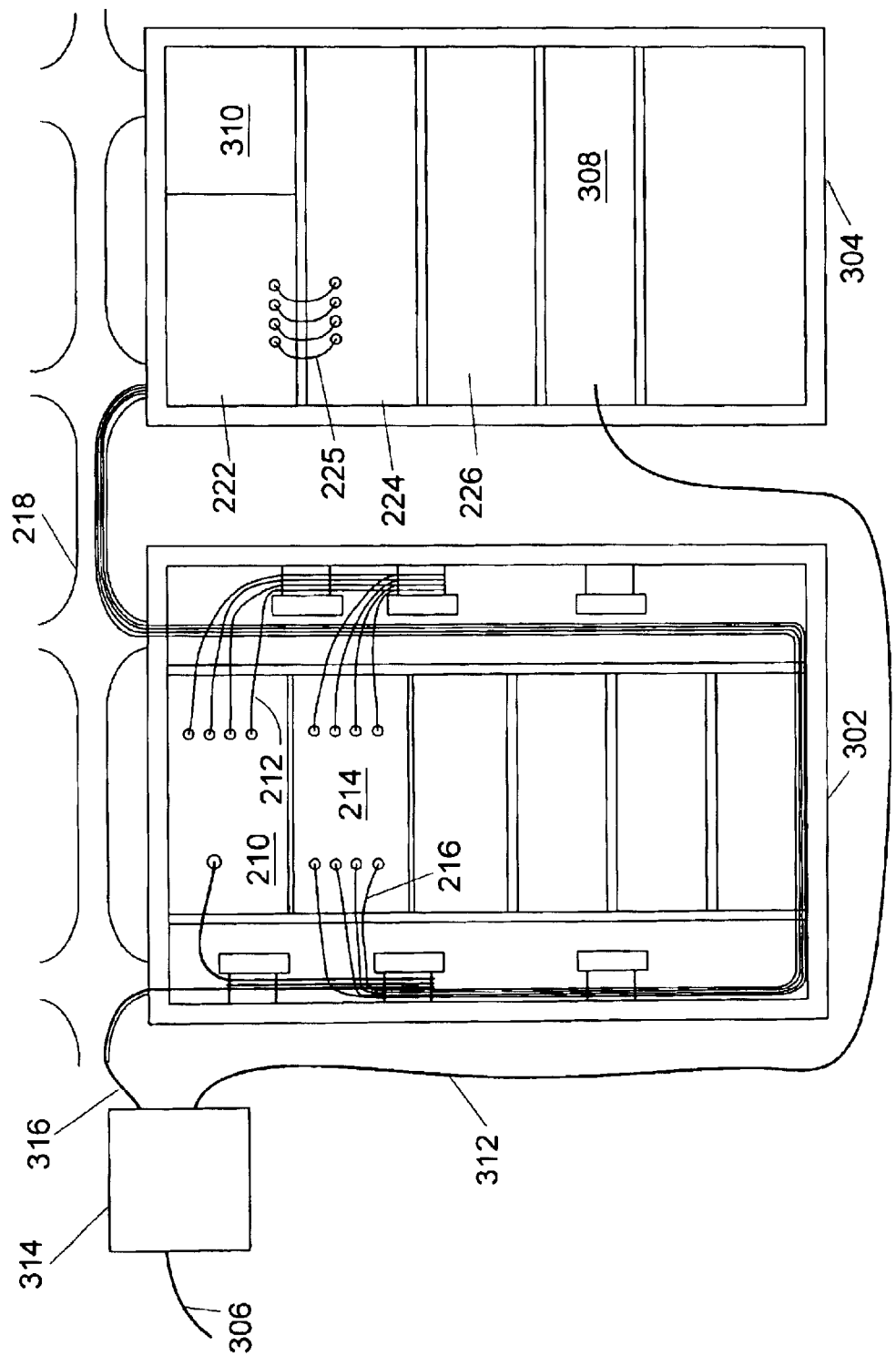
FIG. 3 schematically illustrates an equipment rack and fiber frame equipped with a Raman pump bypass according to an embodiment of the present invention.

One embodiment of such a bypass is illustrated in FIG. 3, which shows a frame 302 and a rack 304. The frame 302 may contain any desired combination of fiber splices, patchcords, connectors, taps, switches and the like, in an interface between the equipment rack 304 and the fiber cable 306. The equipment rack 304 may contain light sources and modulators for generating optical signals in different optical channels, and DWDM units for combining the light from the different light sources, amplifier units for local amplification and optical-electrical interface for converting between electrical and optical signal protocols and vice versa.

In this particular embodiment, the rack 304 includes a Raman pump unit 308, which may include one or more light sources generating optical power at different wavelengths. The different wavelengths may be combined into a pump signal. The relative intensities of the different wavelength components may be adjusted so as produce a desired spectrum in the optical communications signal. The Raman pump unit 308 may, for example, receive information from a channel monitor 310 to determine what the signal spectrum is, and may use this information to control the operation of the Raman amplifier unit 308. In another approach, the Raman pump unit 308 may receive output channel power information from the demultiplexer, and so amplifier performance may be addressed using monitor signals in the equipment rack 304. The output from the Raman amplifier unit 308 may be led along bypass fiber 312 to a bypass coupler unit 314 which combines the light from the Raman pump unit 308 into the fiber cable 306. The connecting fiber cable 316 couples optical communications signal light between the frame 302 and the fiber cable 306. The bypass coupler unit 314 may be physically situated in the frame 302.

Figure 4:
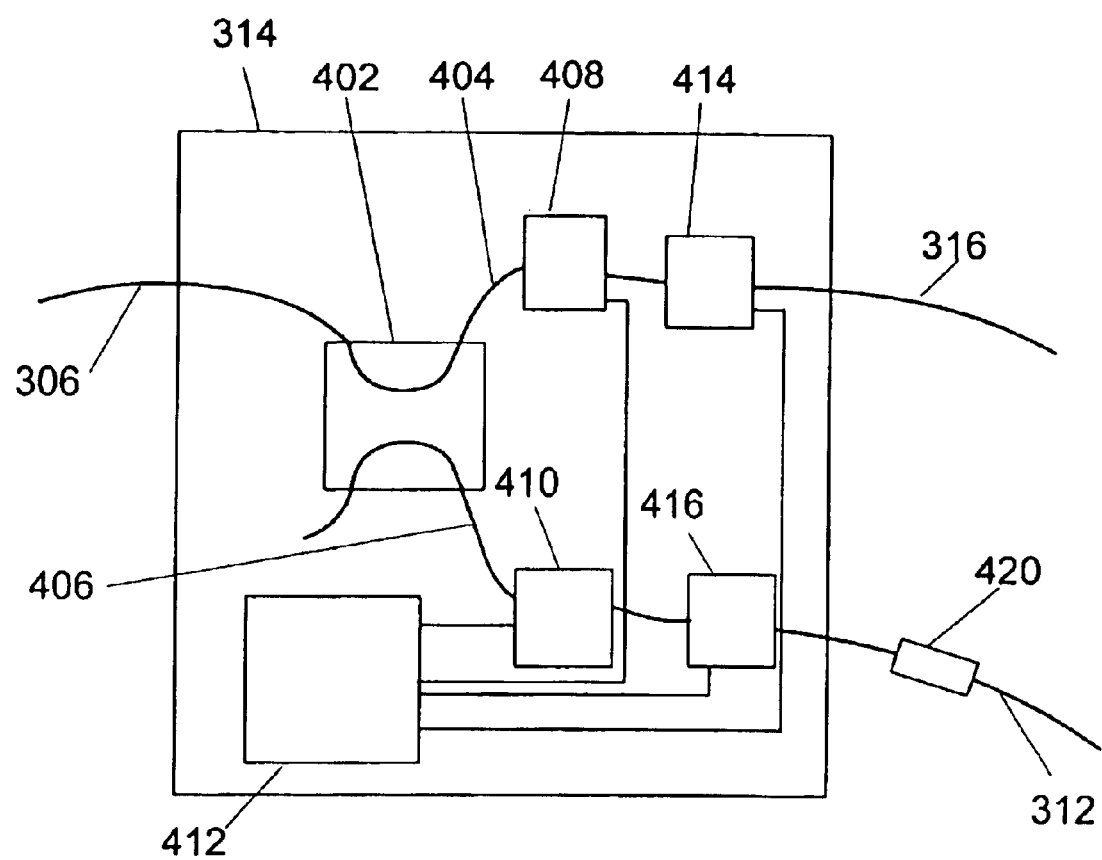
FIG. 4 schematically illustrates a bypass coupler unit according to an embodiment of the present invention.

One particular embodiment of coupler unit 314 is presented in FIG. 4. The coupler unit 314 includes a coupler device 402 that couples Raman pump light from the bypass fiber 312 to the fiber cable 306. The coupler device may be any suitable type of coupler device, for example a fused fiber coupler or a micro-optic thin-film coupler. The bypass coupler unit 314 may also include one or more fiber devices to aid in the control of light passing through the unit 314. For example, the bypass coupler unit 314 may include one or more isolators to prevent propagation of light at one or more wavelengths from propagating in an undesired direction through the unit 314. The unit 314 may also include one or more blocking filters to prevent passage of light of selected wavelength ranges through one or more arms of the unit 314.

The unit 314 may also include safety features, for example to prevent accidental exposure of an operator to the high levels of pump light. One particular example of such an arrangement is presented in FIG. 4, where each arm 404 and 406 from the coupler device 402 includes respective tap monitors 408 and 410 to measure the presence of light. A controller 412 detects the tap monitor signals and, under certain circumstances may operate a respective shutter 414 and 416 to prevent passage of light through the respective arm. For example, the tap monitor 408 may measure the power passing through the arm 404 of light at a communications signal wavelength, while the second tap monitor 406 measures power in the second arm 406 of light at the Raman pump wavelength. This safety feature may be particularly useful when the coupler unit 314 is being serviced by an operator. The coupler unit 314 may also be used as an interlock to control the Raman pump unit 308. For example, a wire may pass from the controller 412 to the Raman pump unit 308 to provide an interlock signal to the Raman pump unit. When an unsafe condition is detected by the controller 412, a signal may be sent to the Raman pump unit 308, for example by shutting down the pump lasers. The wire may be incorporated in the sheathing of the bypass fiber 312. It will be appreciated that the unit 314 may also include other devices and features not detailed here.

The bypass fiber 312 may be connected to the coupler unit 314 and/or the Raman pump unit 308 by a fiber splice, a high power connector 420, or via any other suitable technique.

It will be appreciated that, although FIGS. 3 and 4 have been described in terms of the equipment rack 304 containing equipment for receiving optical signals, the rack 304 may also contain equipment for transmitting optical signals. In such a case, the optical to electrical interface is used to convert the incoming electrical signals in an electrical protocol to signals that may be used to control the optical modulators, to impose information on the optical signals generated by the light sources in an optical communications protocol.

As noted above, the present invention is applicable to optical communications systems, and is believed to be particularly useful for stations that include a Raman amplifier close to the end of the optical fiber link. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical communications station, comprising:
 a fiber communications link carrying a fiber communications signal falling in a signal wavelength range;
 a fiber equipment rack having fiber equipment units for communicating with the fiber communications link, the fiber equipment units including a Raman pump unit generating Raman pump light in a pump light wavelength range;
 a fiber interface frame containing fiber interface devices for interfacing between the fiber communications link and the fiber equipment rack; and
 a coupling unit disposed between the fiber communications link and the fiber interface devices, the coupling unit permitting passage of light in the signal wavelength range between the fiber communications link and the fiber interface devices and the coupling unit coupling the Raman pump light from the Raman pump unit into the fiber communications link, whereby the fiber communications link provides Raman gain to the fiber communications signal.

2. A station as recited in claim 1, wherein the Raman pump unit includes more than one light source generating pump light at a first wavelength within the pump light wavelength range.

3. A station as recited in claim 1, wherein the Raman pump unit includes at least two light sources generating light at different wavelengths within the pump light wavelength range.

4. A station as recited in claim 3, further comprising a controller to control optical power emitted by the at least two light sources so as to adjust the spectrum of the Raman pump light.

5. A station as recited in claim 1, wherein the coupling unit includes a micro-optical filter coupler to couple the Raman pump light into the fiber communications link.

6. A station as recited in claim 1, wherein the coupling unit includes a fused fiber coupler to couple the Raman pump light into the fiber communications link.

7. A station as recited in claim 1, wherein the coupling unit includes at least one isolator to prevent light from propagating within the coupling unit in an undesired direction.

8. A station as recited in claim 1, wherein the coupling unit includes at least one blocking filter to prevent propagation of light of a selected wavelength band along a light path within the coupling unit.

9. A station as recited in claim 1, wherein the coupling unit includes at least one tap monitor to detect the power level of light at a selected wavelength band within the coupling unit.

10. A station as recited in claim 9, wherein the coupling unit further includes a switch controller coupled to receive optical power information from the at least one tap monitor, and an optical switch within an optical path of the Raman pump light coupled to receive control signals from the switch controller.

11. A station as recited in claim 1, further comprising a bypass fiber coupling between the coupling unit and the Raman pump unit.

12. A station as recited in claim 11, wherein the bypass fiber is coupled to the coupling unit via a fiber splice.

13. A station as recited in claim 11, wherein the bypass filter is coupled to the coupling unit via a high power fiber connector.

14. A station as recited in claim 1, wherein the fiber equipment rack includes a wavelength demultiplexing device to separate optical signals in the signal wavelength range by channel wavelength.

15. A station as recited in claim 14, wherein the wavelength demultiplexing device includes optical detectors to detect the respective separated optical signals.

16. A station as recited in claim 14, wherein the fiber equipment rack includes a rare earth-doped fiber amplifier unit to amplify the at least some of the optical signals in the signal wavelength range before being separated in the wavelength demultiplexing device.

17. A station as recited in claim 14, wherein the fiber equipment rack includes an optical to electrical interface to convert signals received from the wavelength demultiplexing device to electrical signals conforming to an electrical communications protocol.

18. A method of operating a fiber communications station, comprising:

propagating optical communications signals between a fiber communications link and a fiber communications equipment rack via a set of fiber interfaces;

generating signals in the fiber communications equipment rack for controlling a Raman pump unit; and injecting Raman pump light from the Raman pump unit into the fiber communications link while bypassing the set of fiber interfaces.

19. A method as recited in claim 18, wherein the Raman pump unit is located in the fiber communications equipment rack.

20. A method as recited in claim 18, further comprising changing the spectrum of the Raman pump light.

21. A method as recited in claim 20, wherein the Raman pump light includes at least two separate pump wavelengths and changing the spectrum of the Raman pump light includes controlling relative amplitudes of the light at the at least two separate pump wavelengths.

22. A method as recited in claim 18, wherein the Raman pump light is injected into the fiber communications link via a coupler unit and further comprising blocking light at one wavelength range from propagating along a light path within the coupler unit normally used for light at another wavelength range.

23. A method as recited in claim 22, further comprising closing a shutter in the coupling unit to prevent passage of light at a selected wavelength range along an optical path within the coupler unit.

24. An optical communications station, comprising;

means for propagating optical communications signals between a fiber communications link and a fiber communications equipment rack via a set of fiber interfaces;

means for generating signals in the fiber communications equipment rack for controlling a Raman pump unit; and means for injecting Raman pump light from the Raman pump unit into the fiber communications link while bypassing the set of fiber interfaces.

25. An optical communications system, comprising:

an optical transmitter producing optical communications signals in a signal wavelength range;

a fiber communications link coupled to receive the optical communications signals; and an optical receiver receiving at least a portion of the optical communications signals from the fiber communications link;

at least one of the optical transmitter and the optical receiver including a fiber equipment rack having fiber equipment units for communicating with the fiber communications link, the fiber equipment units including a Raman pump unit generating Raman pump light in a pump light wavelength range;

a fiber interface frame containing fiber interface devices for interfacing between the fiber communications link and the fiber equipment rack; and a coupling unit disposed between the fiber communications link and the fiber interface devices, the coupling unit permitting passage of light in the signal wavelength range between the fiber communications link and the fiber interface devices and the coupling unit coupling the Raman pump light from the Raman pump unit into the fiber communications link, whereby the fiber communications link provides Raman gain to the fiber communications signal.

26. A system as recited in claim 25, further comprising one or more optical amplifier units disposed on the optical communications link between the optical transmitter and the optical receiver.

27. A system as recited in claim 25, wherein the optical transmitter includes modulated light sources operating at different wavelengths and optical combining elements to combine outputs from the modulated light sources into a fiber output coupled to the optical fiber link.

28. A system as recited in claim 25, wherein the optical receiver includes optical separating elements to separate different wavelengths of light received from the optical fiber link and to direct light at different wavelengths to respective detectors.

\* \* \* \* \*